Sept. 29, 1953      L. MAZZOCCO      2,653,621
AIR REATOMIZER FOR USE IN INTERNAL-COMBUSTION ENGINES
Filed Oct. 1, 1949
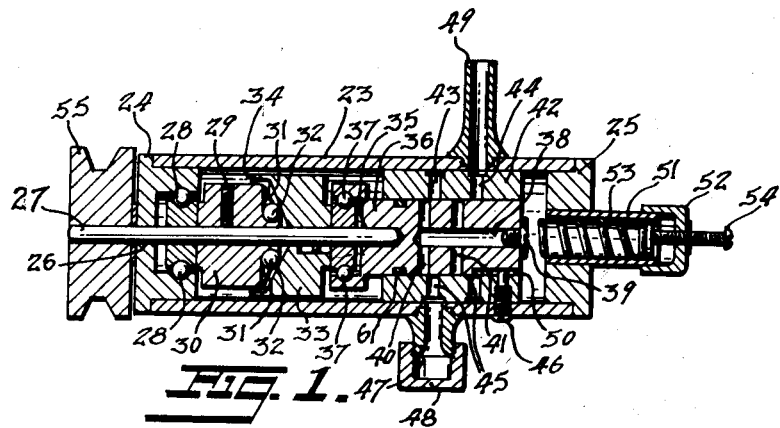
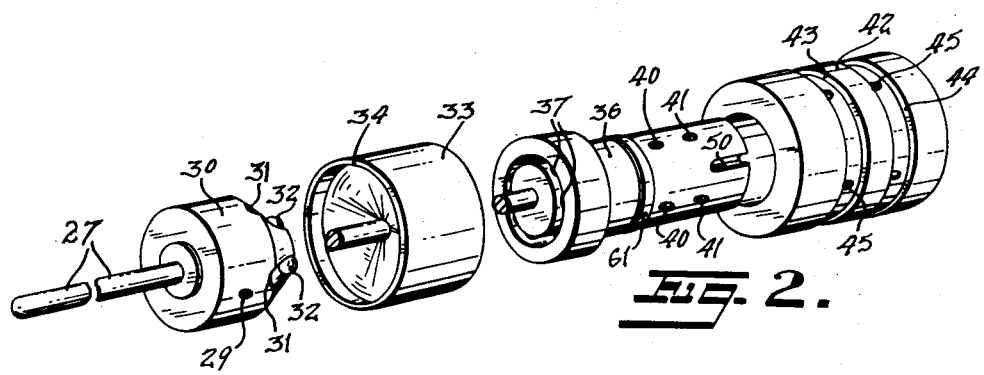
INVENTOR.
LEANDRO MAZZOCCO
BY
ATTORNEY Patented Sept. 29, 1953

2,653,621

UNITED STATES PATENT OFFICE 2,653,621

AIR REATOMIZER FOR USE IN INTERNAL-COMBUSTION ENGINES

Leandro Mazzocco, Rosedale, N. Y.

Application October 1, 1949, Serial No. 119,075

2 Claims. (Cl. 137—53)

The invention relates generally to internal combustion engines and pertains particularly to new and useful improvements in fuel feeding systems therefor.

It has been found that the types of carburetors presently in use are incapable of adequately vaporizing or atomizing a raw fuel in order that the utmost in power can be obtained therefrom under normal operating conditions. This condition has been sought unsuccessfully to be remedied by the employment of auxiliary air supplying means operable by and concomitantly with the carburetor throttle, by thermostatic controls, etc.

One object of the present invention is to provide means in an internal combustion engine and independent of the carburetor thereof for introducing an auxiliary supply of air to the engine intake manifold to thereby further atomize the already carbureted fuel mixture and thus cause the engine to operate at a greater degree of efficiency.

Another object of the present invention is to provide in an internal combustion engine means for introducing an auxiliary supply of air to the intake manifold thereof and automatic means for controlling said supply of air.

Another object of the present invention is to provide an automatic device for controlling an auxiliary air supply to the intake manifold of an internal combustion engine, and which is efficiently operable in cold or warm weather; upon level ground; up or down hill; with or without a load; and at low or extremely high speeds.

Another object of the present invention is to utilize the turning of an internal combustion engine for controlling the amount of auxiliary air supplied to the intake manifold of the engine, to thereby render said supply commensurate with the speed of the engine and thus the need therefor.

Another object of the present invention is to provide a device for supplying automatically controlled amounts of auxiliary air to an internal combustion engine, and which is equally efficiently operable in any physical position, being mountable on the engine and operable by certain elements thereof without interfering with the operation of said engine.

Another object of the present invention is to provide an auxiliary air controlling device which is manufactured to run in oil for lasting quality; is mechanically precisioned and well balanced for positive operation under all conditions; and is of simplified construction for economic purposes.

Still another object of the present invention is to provide an auxiliary air controlling device which when applied to an internal combustion engine results in more engine flexibility; more power; better engine pick-up at all speeds; maximum smoothness; more comfort; and less fuel consumption.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a longitudinal cross-sectional view of the device illustrating the internal elements thereof.

Fig. 2 is an isometric and exploded partial view of the device illustrating the governor, sliding valve, and valve sleeve.

With reference to Figs. 1 and 2, it will be seen that the said cylindrical housing 23 is hollow and is provided with forward and rear capping members 24 and 25, respectively, which members are of such a fit as to be sealed against any leakage of oil from the interior of the housing 23. Said forward capping member 24 is provided with an axially disposed hole 26 into which is fitted a cylindrical spindle 27, which spindle extends substantially into said housing 23 and outwardly beyond the forward capping member 24. Said spindle is adapted to rotate freely, being aided in this action by the provision of a set of ball bearings 28 included in the construction of the said front capping member 24.

Just inside of the above mentioned front capping member 24 and secured to the spindle 27 by a lock screw 29, in order that it might rotate therewith, is a governor head 30. The rear portion of said governor head 30 is formed as to be conical and is provided with three radial recesses 31, which recesses each has seated therein a ball 32. Loosely and slidably carried on said spindle 27 is a governor body 33 which is formed with a conical recess or raceway adapted to fit matchingly the said conical portion of the governor head 30. Said body 33 is further formed with an edge 34 the inner circumference of which is greater than the outer circumference of said governor head 30 and is adapted to receive a portion of said head therein.

The inner extreme of said spindle 27 is adapted to pass through said governor body 33 and extend into an axial bore 35 in a sliding valve 36, the front end of which includes a ball bearing 37 in order that said spindle might rotate freely therein. Said sliding valve 36 is provided with a second axial bore 38 entering from its rear end and being capped by a screw 39. First and second rows 40 and 41, respectively, of radially drilled holes are provided in said valve and contact the said second bore 38. Adapted to fit said valve 36 with a sliding fit is a sleeve 42, which sleeve is provided with first and second annular grooves 43 and 44, respectively. Said grooves 43 and 44 are each provided with radial holes 45 extending to the central bore of the sleeve 42. Now in order that said sleeve may be permanently positioned within the cylindrical housing 23, a lock screw 46 is provided whereby the said sleeve 42 is secured to the said housing 23.

When the sleeve 42 is locked in position in the manner just described the said first annular groove 43 therein is in register with an air inlet 47, fitted in the housing 23 and provided with a filter 48; and the said second annular groove 44 is in register with an air outlet 49 in the housing 23. It will be seen that the mentioned lock screw 46, in addition to locking the sleeve 42 in place, associates with a longitudinal groove 50 in the said sliding valve 36 to thereby prevent the rotation thereof without hampering the longitudinal sliding thereof.

Fitted axially in the aforementioned rear capping member 25 is a cylindrical extension 51 having a cap 52 fitted on the end thereof. Said extension 51 houses a compression spring 53 one end of which engages the rear end of the sliding valve 36 and the other end of which is engaged by a set-screw 54 fitted in the mentioned cap 52.

The forward end of the mentioned spindle 27 is provided with a pulley 55, securely fitted thereon and adapted to cooperate with a fan belt of an engine. It will be understood that the cross-sectional configuration of the belt employed with the engine will determine whether the pulley 55 is of the V or the flat type. In the present instance the pulley is shown as being of the V type.

The cooperation between the fan belt and the pulley 55 causes the said pulley and the spindle 27 securely fitted therein, to rotate, and it will be seen that the rotation of the said spindle will be in accordance to the speed with which the engine is turning.

Air outlet 49 is connected to a manifold at a point beyond the carburetor, and inasmuch as a constant partial vacuum exists in the manifold in consequence of the engine piston action, there is a tendency for air to be drawn through the device inlet 47 and outlet 49 and into the said manifold. However, with the internal components of the device in the positions seen in Fig. 1, which represents their positions during the idling of the engine, at which time the device is adjusted by means of the compression spring 53 and the set screw 54, the radial holes 40 and 41 in the sliding valve 36 are not in register with the radial holes 45 in the sleeve 42. Consequently, any tendency for air to be drawn into the manifold through the inlet 47, the outlet 49 is precluded. It may be mentioned that the above referred to adjustment of the device performed during the idling of the engine is such as to just keep the said valve holes 40 and 41 out of register with the sleeve holes 45 at idling speed.

When the engine speed is increased beyond idling the spindle 27 is rotated with an increased velocity, carrying therewith the governor head 30. This in turn causes the balls 32 to move outwardly from the center, in response to centrifugal force. The outward movement of the balls 32 causes the same to engage the conical recess or raceway of the governor body 33, and with a camming action actuates said body rearwardly. In consequence of this rearward actuation of the governor body the sliding valve 36 is actuated rearwardly also, sliding in the sleeve 42 against the tension of the spring 53 and aligning for registry the said holes 40 and 41 in the valve with the holes 45 in the said sleeve and thereby permitting air to be drawn into the manifold 10.

It will be understood, of course, that the degree of registry between said holes 40 and 41 in the sliding valve 36 and the holes 45 in the sleeve 42 is entirely dependent upon the rotational velocity of the spindle 27 which in turn is dependent upon the speed of the engine. Also, it will be understood that the greater the speed of the engine the greater will be the amount of air permitted to be drawn into the manifold, and a decrease in speed of the engine will permit the spring 53 to return the sliding valve to its forward ineffective position.

It is to be noted that the present device is operable by either a clockwise or a counterclockwise rotation of the spindle 27 and that it may be equally efficiently operable in any physical position. Also, an oil seal 61, which is seen in Figs. 1 and 2, isolates the governor mechanisms which rotate from the valve mechanisms which are non-rotating. This permits the proper lubrication of the rotating elements while precluding the undesirable possibility of oil being drawn into the manifold with the auxiliary air.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Patent is:

1. In a device of the class described, a housing including forward and rear capping members, an air inlet, and an air outlet, a rotatable spindle axially disposed in said housing and bearing in said forward capping member, a governor comprising a head secured on said spindle, radial recesses in said head, balls seated in said recesses, and a governor body loose on said spindle and actuatable longitudinally by said balls at increased velocities of said spindle; a longitudinally slidable valve having a capped central bore and a first and a second row of radial holes connecting thereto, and a sleeve member secured to said housing and comprising a first annular groove associated with the said air inlet, a second annular groove associated with said air outlet, and corresponding holes in said first groove registerable with the first row of radial holes in said sliding valve and corresponding holes in said second groove registerable with the second row of radial holes in said sliding valve when said valve is actuated longitudinally by said governor at increased velocities of said spindle.

2. In a device of the class described, a housing including forward and rear capping members, an air inlet, and an air outlet, a rotatable spindle axially disposed in said housing and journalled at said forward capping member, a governor comprising a head securely fitted on said spindle, radial recesses in said head, balls seated in said recesses, and a governor body loose on said spindle and actuatable longitudinally by said balls at increased velocities of said spindle, a sleeve member secured to said housing and comprising a first annular groove associated with the said air inlet, a second annular groove associated with the said air outlet, and a plurality of radial holes connecting said grooves with the bore of said sleeve, a sliding valve fitting slidably in the bore of said sleeve and having the internal end of said spindle bearing loosely therein and comprising a capped axial bore, a first row of radial holes connecting to said bore and corresponding to the radial holes in the said first annular groove in the said sleeve, a second row of radial holes connecting to said valve bore and corresponding to the radial holes in the said second annular groove, an adjustable compression spring mounted in said rear end capping member and normally maintaining the radial holes of said sliding valve out of register with their corresponding holes in said sleeve, said sliding valve being actuatable longitudinally against the tension of said spring by the said governor at increased velocities of said spindle to thereby render the radial holes of said valve in register with the corresponding holes of said sleeve, and sealing means isolating the said valve from the said governor.

LEANDRO MAZZOCCO.

References Cited in the file of this patent

UNITED STATES PATENTS

| Number | Name | Date |
|---|---|---|
| Re. 14,561 | Rivers | Dec. 10, 1918 |
| 1,210,991 | Silsbee | Jan. 2, 1917 |
| 1,285,998 | Hick | Nov. 26, 1918 |
| 2,045,719 | Munro | June 30, 1936 |
| 2,402,972 | Mitchell | July 2, 1946 |

FOREIGN PATENTS

| Number | Country | Date |
|---|---|---|
| 206,398 | Great Britain | of 1923 |
| 627,632 | France | of 1927 |
| 883,952 | France | of 1943 |